United States Patent [19]

Verbiscar et al.

[11] Patent Number: 4,804,741

[45] Date of Patent: Feb. 14, 1989

[54] GUAYULE RUBBER, RESIN AND BAGASSE RECOVERY AND PURIFICATION PROCESSES

[75] Inventors: Anthony J. Verbiscar, Sierra Madre; Thomas F. Banigan, Arcadia, both of Calif.

[73] Assignee: Anver Bioscience Design, Inc., Sierra Madre, Calif.

[21] Appl. No.: 861,454

[22] Filed: May 9, 1986

Related U.S. Application Data

[62] Division of Ser. No. 615,037, May 23, 1984, abandoned.

[51] Int. Cl.$^4$ ................................................ C08C 2/00
[52] U.S. Cl. .................................. 528/931; 528/503; 528/933
[58] Field of Search ............... 528/481, 502, 503, 930, 528/931

[56] References Cited

U.S. PATENT DOCUMENTS

| 741,256 | 10/1903 | Lawrence | 528/930 |
| 931,121 | 8/1909 | Hunicke | 528/930 |
| 2,434,412 | 1/1948 | Jones | 528/930 |

Primary Examiner—Christopher Henderson

[57] ABSTRACT

Processes are described for the recovery of natural rubber from solutions containing guayule rubber and resins. The resinous rubber is dissolved in a lipophilic solvent such as hexane. The rubber is recovered from the solution in high purity on a heated surface immersed in the solution.

8 Claims, No Drawings

GUAYULE RUBBER, RESIN AND BAGASSE RECOVERY AND PURIFICATION PROCESSES

STATEMENT OF RIGHTS

This invention was made in part with Government support under grant number PFR-79 10187 awarded by the National Science Foundation. The Government has certain rights in this invention.

CROSS REFERENCE

This application is a division of an earlier application 615,037, filed May 23, 1984, now abandoned.

FIELD OF INVENTION

This invention relates to processes that can be used to recover natural rubber of high purity from guayule shrub material.

BACKGROUND OF THE INVENTION

Natural rubber from the guayule shrub, *Parthenium argentatum,* is similar in structure and physical properties to natural rubber from the *Hevea brasiliensis* tree. These natural rubbers have a linear cis-polyisoprene structure that cannot be readily manufactured by a polymerization process. Natural rubber is used in tires for its low rate of wear and heat hysteresis to avoid premature tire damage. For this and other applications there is no suitable substitute for natural rubber. Guayule can actually provide a purer grade of natural rubber than Hevea, depending on the technology used to recover the rubber from the shrub. Guayule rubber is soluble in hydrocarbon, aromatic, clorinated hydrocarbon, ether and other lipophilic solvents. Hevea rubber must be milled to increase its solubility, which also breaks down its molecular weight.

An attractive feature of guayule is that the shrub grows in semi-arid lands of the southwest United States, and is indigenous to certain areas of Texas and Mexico. Large marginal land areas could be made productive with this shrub. At one time there were as many as twenty factories producing rubber in Mexico from wild stands growing in the northern part of that country. Up through 1946 the United States imported more than 150 million pounds of Mexican guayule rubber. During the 1920's and again in the 1940's guayule was cultivated in California and Texas, and processed into rubber. All of the processing facilities used a wet milling flotation process that was water intensive and inefficient. Resin content of the rubber was a problem and the wet process facilitated oxidation of the rubber to lower its quality. In addition to providing a less pure rubber, the wet process did not maximize the resin value of the shrub, and removed potentially nutritious components such as carbohydrates and protein from the bagasse. The wet process requires defoliation prior to rubber processing in order to minimize oxidative degradation of the rubber catalyzed by metal ions in the leaves. This traditional process does not optimize rubber, resin and bagasse values which is necessary for an economically viable guayule industry.

At present there are no operational guayule processing facilities in the United States or Mexico. The guayule plant is a tough woody shrub and the rubber polymer occurs inside the cells. New and improved technology is necessary to process this recalcitrant shrub. The processes described herein are designed to shorten processing time, maximize high purity rubber recovery, preserve physical properties and optimize by-product values.

DESCRIPTION OF THE INVENTION

In contrast to the wet flotation process, the process described here is based on solvent extraction using the whole harvested shrub including the leaves. The metal ions such as manganese, iron and copper in the leaves that promote oxidative degradation of the rubber are not extracted into the rubber solvents, and antioxidants can be added to the solvents. By eliminating a defoliation process step the rubber and resin in the leaves are recovered with the rubber and resin in the wood. The resulting products are total shrub rubber, total shrub resin and total shrub bagasse. In this process, better use is made of the leaves by solvent recovery of their resin and rubber. The leaves also add to the quality of the bagasse which contains mineral, nitrogeneous and carbohydrate components that enhance its potential as a nutritional resource. Alternately, the leaves can be removed from the harvested shrub prior to solvent extraction, in order to isolate the leaf wax which can have an economic value. Defoliation will also eliminate the wax as a possible contaminant in the resin and rubber solvents.

The initial step in the total processing of guayule shrub is deseeding the shrub in the field. This is readily carried out using commercial seed collection devices. The seeds should be removed prior to processing for several reasons. The principal reason is that the seeds contain 27% of a triglyceride oil that may extract into the resin and rubber solvents. Also, the seed oil and seed meal are nutritionally acceptable, and may be recovered as a by-product credit. Clean guayule seeds and seed oil should be suitable for food use.

Guayule shrubs will be harvested by clipping which consists in trimming a grown shrub 8–12 inches above the ground, or by cutting the shrub 1–4 inches above the crown, referred to as pollarding. Both of these methods have been successful on test shrubs. The frequency with which this kind of harvesting can be carried out with substantial coppice regrowth is being determined. The harvested shrubs will be shredded in the field and/or baled and transported to the processing facility.

At the rubber processing facility the shrub material is further comminuted so that resins can be readily solvent extracted. Comminution is accomplished by dry milling or in a homogenizer type mill with a resin solvent. Milling the field shredded shrubs in a resin solvent eliminates the stickiness problem in shrub material handling. Homogenizer milling at high speed with a Super Dispax Reactor or other suitable homogenizer drastically lowers deresination time compared to percolation methods. The resinous solvent miscella is separated from shrub material in a continuous extractor as is used in the oil seed industry. These extractors are made by Crown Iron Works, French Oil Mill Machinery and others. Such commercial continuous extractors will work if the particle size is large enough to be retained in the extraction baskets. A pelleting step may be employed if indicated. The total time for the shrub material in this high speed homogenizer continuous extraction system will be minimal, and far less than percolation or batch stirred methods. The extractors will be lubricated by the resin oils and lower terpenes present. The resinous miscella is desolventized in a solvent recovery column, and the solvent is recycled. Crude oily resins are recovered from the refining column. Wet milling of shrubs in solvent should also reduce heat and oxidative damage to undissolved rubber awaiting recovery in the woody cell.

Our experiments indicate that acetone, ethanol, isopropanol and methyl ethyl ketone are all good deresination solvents. The shrubs need not be dried prior to deresination; in fact added water can facilitate deresination. Removal of residual plant water by these solvents provides a relatively anhydrous deresinated shrub material suitable for rubber extraction. Guayule resins are principally extracellular, so that deresination is a wash out phenomenon, and not highly diffusion limited. However, there will be some solvation of resins in the rubber in the field shredded shrub as plant cells are broken exposing the rubber particles.

Using a Tekmar laboratory homogenizer, three one-minute extractions with acetone at high speed resulted in major deresination. Resins that would otherwise interfere in the follow-on rubber extraction are removed from the whole plant tissue by this three minute homogenizer treatment. Commercial in-line and batch homogenizers such as the Tekmar Super Dispax Reactors are available for extracting shrub materials in a processing plant. Other homogenizers may work equally well. The miscella is separated from the rubber containing shrub material by filtration or by one of the continuous extractors mentioned previously.

The extraction of rubber from plant biomass is more difficult than resin extraction. Percolator and counter current type commercial oil seed extractors are not suitable for rubber for several reasons. Rubber dissolves very slowly, and this rate is increased by mixing. A high stirring rate is directly proportional to the rate of solvation of rubber. The oil seed equipment does not have the high dispersion and shearing action necessary to dissolve rubber in a solvent in a reasonable period of time. The solvation and extraction of rubber from guayule plant tissue takes many hours using conventional oil seed type extraction procedures. A second problem with oil seed extractors is that they are self lubricating. Bearings and other moving parts are designed to be lubricated by the oil in the solvent. This is in contrast to rubber solutions which are sticky and gum up equipment quickly especially during a shut down. Although suitable for resin extraction the oil seed equipment is unsuited to rubber extraction.

In our process the rubber is extracted by in-line homogenizers, such as the Tekmar Super Dispax Reactor type DR3-2314. These units are fitted with triple generator dispersers and run at 1800 rpm at a capacity of 300 gpm. They are well suited to fast efficient extraction of rubber from guayule tissue. The high speed shearing action of these units further speeds up the dissolution of the rubber in these homogenizer reactors in a matter of minutes, compared to many hours for the oilseed type extractors. Rubber extraction is faster and more efficient.

As a comparative example, a finely ground guayule shrub sample was soxhlet extracted for six hours with acetone to remove resins, then twenty hours with hexane to remove rubber. Homogenizer milling of a sample of the same tissue was accomplished by 3×1 minute acetone extractions followed by 2×1 minute cyclohexane extractions, centrifuging and decanting between extractions. The yield of rubber was 0.5% higher by the homogenizer method.

Hexane, cyclohexane and ethyl ether are good rubber solvents that extract less residual resin than most other solvents. Benzene is also a good solvent, extracting less resinous material than toluene. Chlorinated solvents are good rubber solvents but also extract the most resinous compounds as observed in infrared spectra.

Filtration of rubber solutions is a problem due to the propensity for rubber to clog the filters. In our process the effluent from the homogenizers is pumped to settling and washing tanks, or other solid-solvent separators where an antioxidant can be added. The supernatant is transferred to a centrifuge to remove particulates. The derubberized bagasse is passed on to a desolventizer, and the recovered solvent is recycled to the extraction mills. The resulting rubber solution contains minimal quantities of resin, an antioxidant and perhaps a trace of gel. High quality rubber can be recovered from this solution.

After deresination of non-defoliated shrub, traces of chlorophyll or its green degradation products may be retained in the biomass. The rubber solvents extract some of this green color, representing a very small quantity of chlorophyll which is highly colored. A common way to remove this green color from extracted seed oils is by treatment with mineral acids or a decolorizing clay. Mineral acids decolorized the rubber solutions but proved detrimental to the rubber. Oxalic acid works too, but also harms rubber quality. We found that salicylates can be used to decolorize green solutions of guayule rubber. Salicylic acid (2-hydroxybenzoic acid) and 3,5-diisopropylsalicylic acid destroyed the green color in crude guayule rubber extracts on standing with no evidence of deleterious side effects. In fact, these salicylic acid compounds act as antioxidants for the rubber.

Synthetic and natural rubber are recovered from a solvent using steam or hot water. A stream of rubber solution can be sprayed into a steam chamber to evaporate the solvent such as hexane. The rubber precipitates as coagulated wet crumbs which are difficult to dry. Assay of the moisture content of steam coagulated rubber in a large batch is uncertain, which affects processing and compounding the final products. Also, there is no purification of the rubber in this process. Soluble resins will be entrained in the coagulated rubber in about the same proportion that they occurred in the original rubber solution. Our method for recovering rubber eliminates the moisture problem and provides a higher purity rubber.

We found that when solutions of guayule natural rubber are warmed to a certain temperature and stirred, rubber coagulates and precipitates on the surface of the vessel or other heated immersed part. An increase in temperature is normally expected to increase the solubility of a compound in a solvent. The precipitation of the rubber on heating the solution was unexpected and hitherto unknown. Stirring a warmed solution also induces rubber precipitation. These represent processes for the recovery and purification of natural rubber from solvents. Several examples are given as a demonstration.

A solution of crude resinous guayule rubber was prepared in cyclohexane at 2% concentration. When the solution was heated in a flask on a hot plate bubbling started and rubber began to collect on the bottom of the flask. As the temperature was raised bubbling became excessive, looking like carbonation in champagne. The bubbles originate in the rubber that deposits on the bottom of the flask. The phenomenon occurred at a solution temperature below the boiling point of cyclohexane. Decantation left a thin film of colorless rubber on the bottom of the flask. An infrared spectrum of this purified rubber indicated that it contained little or no resin. The starting crude rubber contained 3.5% resins which was clearly observed in an inspection of the carbonyl area of an infrared spectrum.

A further test of this phenomenon was carried out using 2% solutions of the crude 3.5% resinous rubber in hexane, carbon tetrachloride, toluene and and tetrahydrofuran. When these rubber solutions were warmed in test tubes immersed in a water bath, there was noticeable evolution of bubbles starting at about 50°, especially on stirring the solutions. Bubbling increased as the temperature was raised. Deposition of rubber occurred on the walls of the test tubes or on the thermometer. The deposition started below the boiling point of the solvents. It occurs on hot surfaces and on moving parts in the warmed solution.

In a third test 2% solutions of the 3.5% resinous rubber in hexane and carbon tetrachloride were warmed gently in a water bath below the rubber deposition temperature. An electrically heated rod was inserted into each solution and the temperature of the rod was raised. Bubbling occurred around the area of the heated rod in each case. A film of rubber that deposited on the rod was peeled off. The rod was returned to the solution whereupon second and third coatings of rubber were deposited. Thus a continuous process for rubber recovery can be carried out for crude resinous rubber, thereby recovering a higher purity rubber product from solutions.

This phenomenon does not occur with polystyrene of equal molecular weight and equal concentration in solutions.

A tentative explanation of this unusual phenomenon is apparently related to solvation of the rubber molecules. In solution each rubber molecule is solvated, i.e., surrounded, by many solvent molecules. On heating the solution the rubber and solvent molecules have increased kinetic energy and motion. Heated surfaces provide enough energy to expel or boil off solvent molecules from the rubber chain. The rubber chain also moves around exposing its temporarily desolvated surface. One rubber molecule semi-free of solvent molecules readily coheres to another exposed rubber molecule surface and precipitates. Cohesion of rubber to rubber is a well known phenomenon. Deposition is due to nearby partially solvated rubber molecules cohering to one another. The precipitation of natural rubber from solution by this method is dependent on the nature of the solvent. Solvent molecules requiring more energy to increase kinetic activity should be less suitable than more readily energized molecules. Lower boiling solvents appear to deposit rubber more readily than higher boiling solvents. Deposition of rubber is most vigorous near the boiling point of the solvent. The energy of solvation of the solvent molecule to a rubber molecule should be a factor also.

EXAMPLE 1

Shrub Sampling

A standard shrub biomass sample was prepared from three year old variety #593 guayule shrubs. Four shrubs were uprooted, defoliated, cleaned, dried and ground in an Alpine Model 25 hammer mill fitted with a 3 mm round hole screen. The dry ground shrub material, K4b, weighed 4070 grams. The leaf material, K4a, weighed 600 grams, or 12.9% of the whole shrub. These biomass materials were used to develop deresination, derubberization, compositional and other data. Another group of twenty-four 2.5 year old variety #593 guayule shrubs were harvested, cut, dried in a forced air oven at 50° overnight and ground in an Alpine, then a Weber mill to pass a 35 mesh screen. This dried ground whole shrub material, K152a, containing roots, branches and leaves weighed 11.28 kg with a moisture level of 4%.

EXAMPLE 2

Deresinations With Acetone

For these deresination experiments, 1.00 gram samples of guayule woody tissue, K4b, were weighed into 50 ml centrifuge tubes. Acetone, 10 ml or 20 ml, was added and the system was subjected to Tekmar Tissumizer homogenization extraction at a top speed setting of 80 for times varying from 0.5–5 minutes. After 20 minutes of centrifuging at 1000 G the supernatant acetone extracts were decanted, stripped to dryness and weighed to provide a resin yield. Second and third resin extractions were carried out on several of the samples. This data is summarized in Table 1. The data indicate that longer extraction times and larger quantities of solvent facilitate removal of resins. Variations in the data can be explained by differences in standing times for the solvent-tissue system during workups. Holdups of solvent on the woody tissue after decanting an extract results in an apparent lower value for the first extract. A triple extraction at 1 minute each using 20 ml of acetone per extraction assures major removal of resins, as evidenced by the infrared spectra of subsequent extracted rubber.

TABLE 1

| | Resin Yield, mg. | | | | | | | |
|---|---|---|---|---|---|---|---|---|
| | Solvent | | | | | | | |
| Time, min. | Acetone, 10 ml | | | | | Acetone, 20 ml | | |
| | FIRST EXTRACT | | | | | | | |
| 0.5 | 48 | 53 | 51 | 46 | 55 | | | |
| 1 | | | | | | 52 | | |
| 3 | | | | | | | 60 | |
| 5 | | | | | | | | 65 |
| | SECOND EXTRACT | | | | | | | |
| 0.5 | 9 | 17 | | | | 14 | 10 | |
| | THIRD EXTRACT | | | | | | | |
| 1 | | | | | | 8 | | |
| Totals | 57 | 70 | 51 | 46 | 55 | 74 | 70 | 65 |

EXAMPLE 3

Deresinations With Various Solvents

Five solvents were compared for their ability to extract resin from guayule woody tissue K4b in a single extraction. Two times 2.00 gram samples were extracted with 20 ml of each solvent for 1 minute in the Tekmar Tissumizer homogenizer. The extracts were centrifuged, the supernatant decanted, evaporated to dryness under vacuum and weighed. Results are in Table 2. In this experiment methyl ethyl ketone extracts the highest quantity of resin. Methanol extracts the second largest quantity of material, but some of this is more hydrophilic compounds rather than terpenaceous material. Ethanol, isopropanol and acetone each extract about the same quantity of resins.

TABLE 2

| Solvent | Sample Wt. | Resin Wt. | Resin/1 g Sample |
| --- | --- | --- | --- |
| Methanol | 4 g | 228 mg | 57 mg |
| Ethanol | 4 g | 175 mg | 44 mg |
| Isopropanol | 4 g | 183 mg | 46 mg |
| Acetone | 4 g | 183 mg | 46 mg |
| Methyl ethyl ketone | 4 g | 285 mg | 71 mg |

EXAMPLE 4

Deresinations With Water Wet Solvents

Several solvents containing varying amounts of water were examined for their ability to extract resins that can interfere with the quality of subsequently extracted rubber. Resin impurities in rubber contain carbonyl and hydroxyl groups. Wet solvents will tend to remove some of the more hydrophilic resins especially those containing hydroxyl functions.

A 2.00 gram sample of guayule woody tissue K4b was extracted twice with 20 ml quantities of the wet solvents, running the homogenizer for one minute each time. The extracts were centrifuged and the supernatants were decanted. After drying, the tissue residue was extracted twice with 20 ml portions of cyclohexane to recover rubber. The cyclohexane extracts were evaporated to dryness in a vacuum, weighed, and monitored for resins by infrared spectrometry. Hydroxyl resins absorb around 3400 cm$^{-1}$ and carbonyl resins around 1700 cm$^{-1}$. The resin solvents were rated on the basis of how much hydroxyl and carbonyl absorption occurred in the IR spectrum of the rubber. Results are in Table 3. The solvents are noted as % with the remainder being water. Rubber yields were about equal, but quality varied from good to superior. The lower the resin content of the rubber, the better the deresination.

TABLE 3

| Resin extraction | | Rubber | |
| --- | --- | --- | --- |
| First | Second | Yield, % | Quality |
| 95% acetone | 95% acetone | 7.25 | superior |
| 90% acetone | 100% acetone | 7.30 | superior |
| 80% acetone | 100% acetone | 7.25 | superior |
| 95% ethanol | 95% ethanol | 7.10 | good |
| 95% isopropanol | 95% isopropanol | 7.10 | good |

EXAMPLE 5

Homogenizer Rubber Extraction

Three 1.00 gram guayule woody tissue K4b samples were deresinated by homogenizing for one minute three times in 20 ml acetone each time. The resin yields for these three samples after triple deresination were 68 mg, 70 mg and 71 mg. The three deresinated residues were then extracted with the Tekmar laboratory homogenizer for one minute each time using 2×20 ml portions of cyclohexane. After centrifuging the extracts, decanting the supernatants, and evaporating the solutions to dryness under vacuum, the rubber residues weighed 80 mg, 80 mg and 75 mg respectively. This 2×1 minute extraction time was found adequate to extract 95% of the rubber from the woody tissue. Increasing homogenizer times to 2×1.5 minutes or 2×2 minutes did not increase the rubber yield. Deresination was also effective using three extractions with 95% aqueous acetone. Rubber quality was monitored by infrared spectra and found to contain a minimum contamination by hydroxyl and carbonyl resin compounds.

EXAMPLE 6

Rubber Extraction With Various Solvents

Eleven 2.00 gram guayule whole shrub tissue K152a samples were deresinated by homogenizer extracting 3×1 minute in 20 ml acetone each time. The shrub meal residues were dried in an oven to desolventize prior to rubber extraction. The dried samples were then extracted with 2×20 ml portions of hexane, cyclohexane, methylchloroform, methylene dichloride, chloroform, carbon tetrachloride, benzene, toluene and ethyl ether using the Tekmar laboratory homogenizer. The extracts were centrifuged and the supernatants were decanted. The shrub residue did not separate in the centrifuged chloroform and carbon tetrachloride extracts, and these were not examined further. The remaining supernatant extracts were evaporated to dryness, weighed, and evaluated by color and an infrared spectrum. Infrared spectra were taken of films cast on a silver chloride plate. Hydroxyl containing resins show absorption at 3400 cm$^{-1}$ and carbonyl containing resins in the 1730–1700 cm$^{-1}$ region. The better solvents such as cyclohexane had higher yields of rubber which was light green to yellow in color, with minimal carbonyl and hydroxy absorption in the infrared spectrum. Results are in Table 4.

TABLE 4

| Solvent | Appearance | Rubber, mg/1 g sample | Rubber Quality |
| --- | --- | --- | --- |
| Hexane | clear, light green-yellow | 56.9 | good |
| Hexane | clear, light green-yellow | 55.1 | good |
| Cyclohexane | turbid, light green-yellow | 65.0 | good |
| Cyclohexane | turbid, light green-yellow | 60.0 | good |
| Benzene | clear, medium green | 57.4 | fair |
| Toluene | clear, medium green | 70.1 | fair |
| Ethyl ether | clear, medium green | 57.5 | good |
| Methylchloroform | turbid, green | 76.4 | poor |
| Methylenedichloride | turbid, green | 82.4 | poor |

EXAMPLE 7

Decolorization of Rubber Solution

Two grams of dry pulverized guayule leaves were deresinated with 2×20 ml of acetone using a Tekmar laboratory homogenizer. After centrifuging and decanting the supernatant, rubber was extracted from the residue biomass using 2×20 ml cyclohexane. The deep green acetone extract contained 95% or more of the chlorophyll and the light green cyclohexane extract, about 5%. Hydrochloric acid and oxalic acid added to cyclohexane extracts quickly destroyed the green color leaving clear pale yellow solutions. The antioxidants butylated hydroxytoluene (BHT) and phenothiazine had no effect on the color. Salicylic acid and 3,5-diisopropylsalicylic acid added to the cyclohexane solution of rubber and chlorophyll products caused a slow decolorization to a light yellow. The carboxyl groups of the salicylates act as acids to destroy the green color of the chlorophyll pigments, whereas their phenolic functional groups act as antioxidants to protect the rubber against air oxidation.

EXAMPLE 8

Rubber Recovery From Flasks

Solutions of guayule rubber containing 3.5% resins were made up in n-hexane and cyclohexane at 2% concentrations. The solutions in Erlenmeyer flasks were slowly warmed on a hot plate. At about 50°-55° bubbling started and rubber began to collect on the bottom of each flask. The bubbles arose from the area of the aggregated rubber layer. As the temperature was raised, bubbling became more excessive. Maximum bubbling and deposition of rubber occurs near the boiling point of the solvent. The supernatant solution was decanted leaving a deposit of rubber on the bottom of each flask. An infrared spectrum of this rubber indicated that it contained little or no resin, as evidenced by an absence of carbonyl group absorption in the 1700 cm$^{-1}$ area and hydroxyl absorption at 3400 cm$^{-1}$.

EXAMPLE 9

Rubber Recovery From Various Solvents

Solutions of guayule rubber containing 3.5% resins were made up in n-hexane, cyclohexane, carbon tetrachloride, toluene and tetrahydrofuran at 2% concentrations. The five rubber solutions in test tubes were slowly heated in a water bath stirring carefully with a thermometer. There was a noticeable evolution of bubbles at about 50°-55° while stirring. Rubber deposited on the walls of the test tubes and on the thermometer with which the solutions were stirred. Stirring increased the bubbling and deposition of rubber which occurs below the boiling point of the solvents.

EXAMPLE 10

Rubber Recovery From Immersed Surface

Solutions of guayule rubber containing 3.5% resins were made up in n-hexane and carbon tetrachloride at 2% concentrations. The solutions in test tubes were immersed in separate water baths set 5°-7° below the boiling point of each solvent, that is about 60° for hexane and about 68° for carbon tetrachloride. An electrically heated rod was immersed in the solutions. The temperature of the rod was controlled with a powerstat. A fine stream of bubbles formed on the surface of the hot metal rod. After several minutes the rod was removed and found to be coated with a significant layer of rubber. The rubber was peeled off the rod, and the rod was returned to the solution. A second and third coating of rubber were collected on the rod in this manner.

We claim:

1. A process for recovering natural rubber from a lipophilic solvent by immersing a heated surface in the solution, whereupon the rubber precipitates and coagulates on the heated surface and can be thereby removed from the solution.

2. A process for recovering natural rubber from a lipophilic solvent wherein a heated surface separate from the solution vessel is immersed in the rubber solution and removed to recover the rubber aggregated on the dipped surface.

3. A process described in claims 1 or 2 wherein the solvent is an aliphatic hydrocarbon selected from the group consisting of pentane, heptane, octane, isooctane, cyclohexane and hexane.

4. A process described in claims 1 or 2 wherein the solvent is a chlorinated hydrocarbon selected from the group consisting of carbon tetrachloride, chloroform, methylchloroform, methylene dichloride, ethylene dichloride, propylene dichloride, trichloroethylene, perchloroethylene, and 2-chlorooctane.

5. A process described in claims 1 or 2 wherein the solvent is an aromatic hydrocarbon selected from the group consisting of benzene, toluene and xylene.

6. A process described in claims 1 or 2 where in the solvent is an ether selected from the group consisting of isopropyl ether, dioxane and tetrahydrofuran.

7. A process described in claims 1-6 wherein the rubber solution is heated to a temperature below or as high as the boiling point of the solvent.

8. A process described in claims 1-6 wherein the rubber is separated from natural resinous or other contaminating materials in a solution, and thereby purified.

* * * * *